US010854047B1

(12) United States Patent
Hodges

(10) Patent No.: US 10,854,047 B1
(45) Date of Patent: Dec. 1, 2020

(54) CARD-BASED GAME SYSTEM AND ASSOCIATED METHOD OF PLAY

(71) Applicant: Scientific Games International, Inc., Newark, DE (US)

(72) Inventor: Danielle Lea Hodges, Dawsonville, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 16/541,221

(22) Filed: Aug. 15, 2019

(51) Int. Cl.
*A63F 13/00* (2014.01)
*G07F 17/32* (2006.01)

(52) U.S. Cl.
CPC .................................. *G07F 17/329* (2013.01)

(58) Field of Classification Search
None
See application file for complete search history.

(56) References Cited

U.S. PATENT DOCUMENTS 5,100,139 A * 3/1992 Di Bella ................. A63F 3/065 273/139
5,118,109 A * 6/1992 Gumina ................ A63F 3/0665 273/139
6,247,697 B1 * 6/2001 Jewett ....................... A63F 1/00 273/292
6,457,714 B1 10/2002 Feola
7,104,544 B2 9/2006 Reiner et al.
10,518,166 B1 * 12/2019 Chen .................. A63F 3/00138
2002/0147039 A1 * 10/2002 Mahar ....................... A63F 1/00 463/11
2004/0186600 A1 9/2004 Tumacder et al.
2005/0067783 A1 * 3/2005 Moore ...................... A63F 1/00 273/292
2005/0189716 A1 * 9/2005 Yu ............................ A63F 1/04 273/292
2005/0255905 A1 * 11/2005 Duke ...................... G07F 17/32 463/17
2005/0280210 A1 12/2005 Harrison
2006/0197283 A1 * 9/2006 Thinnes .............. A63F 3/00157 273/269
2006/0279043 A1 * 12/2006 Adams ...................... A63F 9/10 273/292
2006/0285780 A1 * 12/2006 Knoerzer .............. B65D 31/02 383/111
2007/0018400 A1 * 1/2007 Feola .................. A63F 3/00157 273/292

(Continued)

*Primary Examiner* — Paul A D'Agostino
(74) *Attorney, Agent, or Firm* — Dority & Manning, P.A.

(57) ABSTRACT

A card-based game system, and associated method of play, includes a package, and a first set of cards and a second set of cards contained in the package. The first set of cards are prize cards having prize indicia indicating a prize award assigned to the prize card, the prize indicia covered by a removable covering. The second set of cards are command cards, each command card having instructions to players to perform an act that results in a gain or loss of a prize card. A sufficient number of the prize cards and command cards are provided for play of a game wherein a plurality of the prize cards are distributed to each player and a plurality of the prize cards remain as common cards. Upon completion of the game, each player removes the covering on their prize cards to reveal the prize award assigned to the prize card.

18 Claims, 4 Drawing Sheets

(56) References Cited

U.S. PATENT DOCUMENTS

| | | | | | |
|---|---|---|---|---|---|
| 2007/0120322 | A1* | 5/2007 | Feola | A63F 1/00 | 273/274 |
| 2007/0235940 | A1* | 10/2007 | Stuart | A63F 1/00 | 273/308 |
| 2008/0290596 | A1* | 11/2008 | Bogle | A63F 3/06 | 273/139 |
| 2009/0061397 | A1* | 3/2009 | Treloar | A63F 1/00 | 434/129 |
| 2010/0244430 | A1* | 9/2010 | Gillespie | G09F 3/02 | 283/101 |
| 2010/0301562 | A1 | 12/2010 | Nedelcu | | |
| 2010/0308540 | A1* | 12/2010 | Williams | A63F 1/02 | 273/295 |
| 2011/0079958 | A1* | 4/2011 | Arlestig | A63F 1/00 | 273/292 |
| 2011/0101612 | A1* | 5/2011 | Feola | A63F 1/00 | 273/292 |
| 2014/0274318 | A1* | 9/2014 | Bronshteyn | G07F 17/3255 | 463/25 |
| 2014/0375045 | A1* | 12/2014 | Jackson | A63F 3/0605 | 283/67 |
| 2015/0080117 | A1* | 3/2015 | Czyzewski | G07F 17/3258 | 463/27 |
| 2015/0115593 | A1* | 4/2015 | Jackson | B41M 3/005 | 283/67 |
| 2015/0297984 | A1* | 10/2015 | Ogilvie | A63F 11/00 | 273/148 R |
| 2016/0045816 | A1* | 2/2016 | Ogilvie | A63F 1/02 | 273/295 |
| 2016/0271487 | A1* | 9/2016 | Crouse | A63F 1/00 | |
| 2016/0332066 | A1* | 11/2016 | Dulin | A63F 1/02 | |
| 2016/0339332 | A1* | 11/2016 | Nguyen | A63F 1/02 | |
| 2017/0157500 | A1* | 6/2017 | Castro | A63F 13/80 | |
| 2018/0012453 | A1* | 1/2018 | Anderson | G07F 17/3267 | |
| 2018/0330573 | A1* | 11/2018 | Wester | G07F 17/3288 | |
| 2018/0335875 | A1* | 11/2018 | Kerns | H04W 12/12 | |

* cited by examiner

CARD-BASED GAME SYSTEM AND ASSOCIATED METHOD OF PLAY

FIELD OF THE INVENTION

The present invention relates generally to card-based game systems for play by multiple players, and more particularly to a card-based game that incorporates lottery tickets as components of the game system.

BACKGROUND

Lottery games have become a time-honored method of raising revenue for state and federal governments the world over. Traditional scratch-off and draw games have evolved over decades, supplying increasing revenue year after year. However, after decades of growth, it is recognized that new and innovate games are needed to prevent the sales curves associated with the traditional games from flattening out. Consequently, both lotteries and their service providers are presently searching for new methods of increasing sales.

Play of scratch-off lottery tickets is essentially a highly individualized experience for the player. The player purchases a ticket and plays the ticket at a time and place of their choosing. Thus, there is very little social interaction between players. It is felt that a game system and methodology that encourages social events and interaction between multiple players would benefit players and game providers alike. The players would have a more personable, entertaining, and socially interactive experience related to lottery ticket games and the game providers (and sponsors) would experience increases ticket sales and marketing opportunities.

Board-based games that involve interaction between multiple players have been popular for decades and have recently made a resurgence in popularity. It would be beneficial to lottery ticket players and game providers (and sponsors) if sale and play of lottery tickets could be technically and successfully integrated with (or into) a board or card-based game that encourages entertaining and rewarding social and, to a degree, competitive interaction between multiple players. Such a game might reach a broader audience of potential lottery players, including non-players or lapsed players.

The present invention provides a unique game system and methodology to the issue discussed above.

SUMMARY OF THE INVENTION

Objects and advantages of the invention will be set forth in part in the following description, or may be obvious from the description, or may be learned through practice of the invention.

Aspects of the present invention are drawn to a card-based game system for play by a plurality of players, such as from two to eight players, or two to eight teams of players. The system includes a package, such as a box, container, wrapping or packaging material, and the like. A first set of cards and a second set of cards are contained in the package. For example, the first and second sets of cards may be shrink-wrapped or otherwise bound together with a clear wrapping material. The first set of cards are configured as prize cards, wherein each prize card is associated with a potential prize, such as a monetary prize or other type prize having value (e.g., a voucher for goods or services). The prize award associated with a prize card may be, however, of zero value. In other words, not all of the prize cards have an actual prize award of value associated therewith. The prize cards may be configured such that a prize structure of a certain value is distributed randomly between certain ones of the prize cards. Each prize card includes prize indicia thereon that indicates the prize award assigned to the respective card, wherein the prize indicia is covered by a removable covering, such as a pull-tab or a scratch-off coating (SOC).

The second set of cards are configured as command cards, wherein each command card includes written instructions to players for verbal or non-verbal acts resulting in the gain or loss of the prize cards. The package contains a sufficient number of the prize cards and the command cards for play of a game wherein a plurality of the prize cards are distributed to each of the players and a plurality of the prize cards remain as common cards in a "pot."

Upon completion of the game, each of the players in possession of a prize card removes the covering to reveal the prize award (if any) assigned to the prize card.

In a particular embodiment, the prize cards and the command cards comprise visually distinguishing characteristics. For example, such characteristic may be a differentiating color on the back of the cards. The prize cards may have a black background and the command cards may have a white background (or other differentiating colors or indicia) on the back of the respective cards that enables the players to readily distinguish between and sort the prize and command cards.

In a particular embodiment, the package is provided by a lottery game provider and the prize cards are scratch-off lottery tickets, the covering including a scratch-off coating applied over the prize indicia, as with conventional scratch-off lottery tickets. The lottery tickets in the game may be a subset of a larger production run of tickets having an overall prize distribution scheme. For example, the lottery game provider may print a run of the tickets for game system packages sold in a particular state or other region, wherein the collective tickets have a certain guaranteed prize structure distributed randomly between the all of the tickets, as is well-known in the industry. In this embodiment, it may be that none, some, or all of the prize cards in a particular package have a monetary prize award assigned thereto.

In an alternate embodiment, each package may have a minimum collective prize award value that distributed randomly across at least certain prize cards and is advertised on the package. For example, it may be guaranteed that at least one prize card in the first set of cards is a $25 winner, and so forth.

In the lottery-ticket embodiment, the lottery ticket prize cards may be treated by the lottery provider and sponsoring entity (e.g., a state lottery commission) as any other scratch-off lottery ticket sold in the region. For example, winning prize cards may be redeemed by a player as would any other winning lottery ticket in the state or region.

In certain embodiment, the card-based game system may include one or more replacement sets of prize cards available without an associated set of command cards, wherein the replacement set of prize cards can be used with the first set of cards for play of a subsequent game. The replacement set(s) can be provided with the package or may be purchased separately from the package.

The instructions on the command card may be presented in various ways. For example, in one embodiment, the instructions are printed on the command card and require the player to read the card to the other players and perform a required act, which may be forfeiting one of their prize cards to another player or the common pot of prize cards, or taking a prize card from another player or the common pot of prize cards. Other command cards may instruct the player to not read the card to the other players, but to perform a specific act, wherein successful performance of the act results in the player taking a prize card from another player or the common pot of prize cards and non-performance (or unsuccessful performance) of the act results in the player forfeiting one of their prize cards to another player or to the common pot of prize cards.

In a unique embodiment, one or more of the command cards may be a bonus card that instructs the player to select and play one of their prize cards, wherein the played prize card is removed from the game and retained by the player.

The present invention also encompasses method embodiments for conducting a card-based game with a plurality of players using the card-based game system discussed above. For example, the method may include opening the package and separating the prize cards and the command cards. Each player in the game is then provided with a defined number of the prize cards, the remaining prize cards designated as common prize cards in the game pot. The players then take turns drawing one of the command cards and performing verbal or non-verbal acts required by the command cards to acquire additional prize cards from the other players or from the pot of common prize cards. The game is terminated when the pot of common prize cards has been exhausted, wherein the player holding a greatest number of the prize cards is declared a winner in the game. Once the game is over, the players "play" the prize cards in their possession by removing the covering from the prize indicia to reveal the prize award assigned to the prize card (which may a monetary award or zero value).

As discussed above, the players may forfeit prize cards to one or more other players or to the pot of common prize cards for not successfully performing the act required by their drawn command card.

In a particular method embodiment, the package is provided by a lottery game provider and the prize cards are scratch-off lottery tickets wherein the covering is a scratch-off coating applied over the prize indicia. The prize cards can be treated by the lottery game provider (and a sponsoring entity, such as a state or other governmental body) as any other scratch-off lottery ticket sold in the region. Thus, players can redeem winning prize cards with the lottery provider as they would any other scratch-off lottery ticket.

The method may include using a replacement set of prize cards to commence a subsequent game with the same second set of command cards. The replacement set may be provided within the same package, or may be purchased separate from the package.

DETAILED DESCRIPTION

Figure 1:
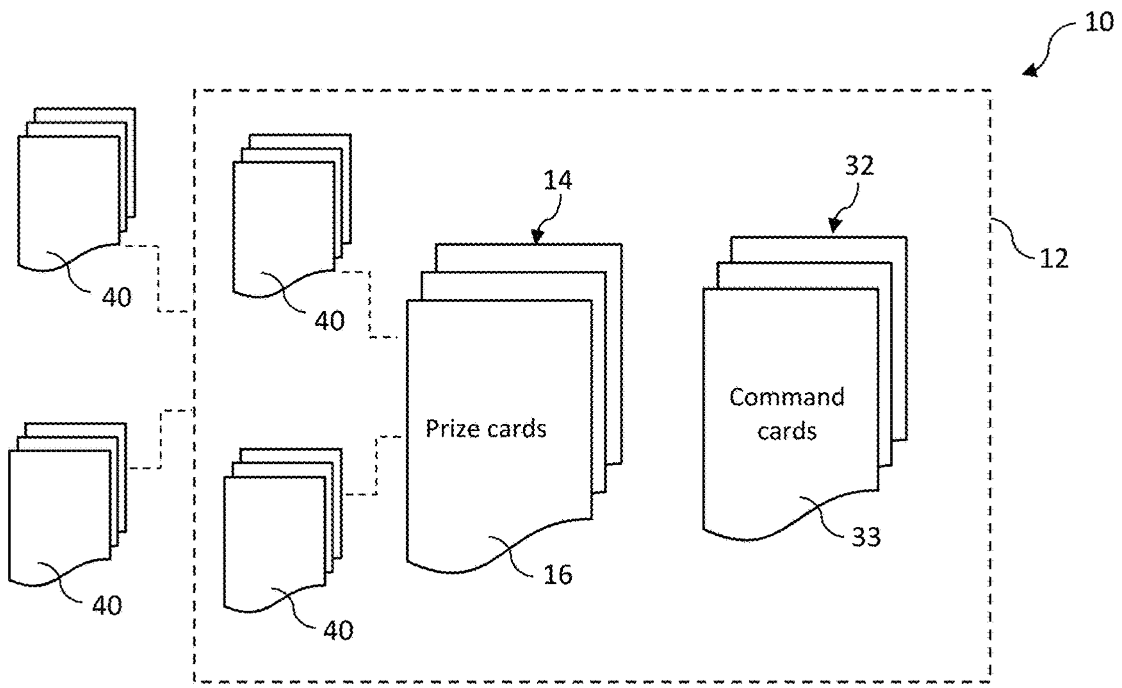
FIG. 1 is a schematic depiction of an embodiment of a card-based game system in accordance with aspects of the invention.

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these and other modifications and variations as come within the scope and spirit of the invention.

Referring to FIG. 1, an embodiment of a card-based game system 10 is depicted for play by a plurality of players, such as from two to eight players. The system 10 includes a package 12, which can be any conventional packaging such as a box, container, wrapping or packaging material, and the like. The system 10 includes a first set of cards 14 and a second set of cards 32 contained in the package 12. In a particular embodiment, the first 14 and second 32 sets of cards may be shrink-wrapped or otherwise bound together with a clear, conventional wrapping material.

Figure 2A:
FIG. 2*a* is a back view of an embodiment of a prize card.
Figure 2B:
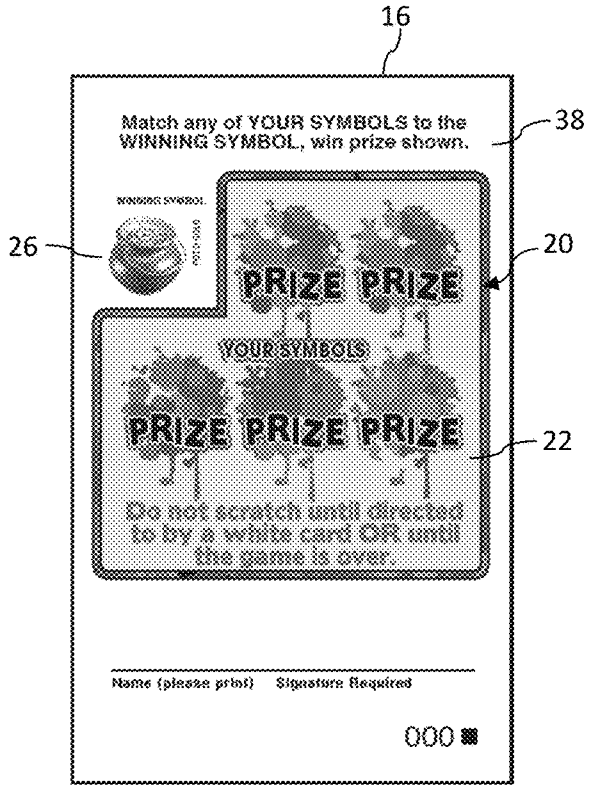
FIG. 2*b* is a front view of an embodiment of a prize card.

Referring to FIGS. 2*a* and 2*b*, the first set of cards 14 are configured as prize cards 16. Each prize card 16 has a potential prize award, such as a monetary prize or other type of prize having value (e.g., a voucher for goods or services) associated therewith. The potential prize award is, however, hidden from the players until the game is over. The prize award associated with a prize card 16 may be, however, of zero value. In other words, not all of the prize cards 16 have an actual prize award of value associated therewith. The prize cards 16 may be configured such that a prize structure of a certain value is distributed randomly between certain ones of the prize cards 16.

Figure 2C:
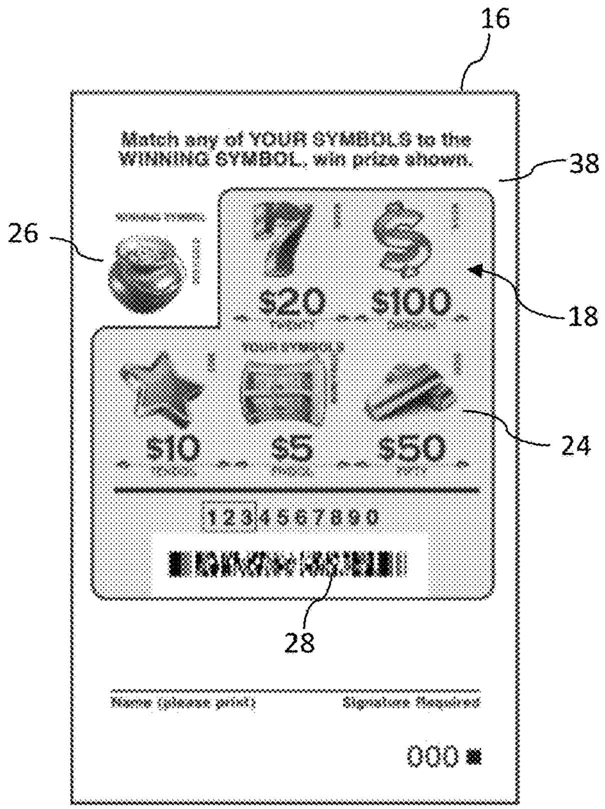
FIG. 2*c* is a view of the prize card of FIG. 2*a* after the covering has been removed from over the prize indicia.

Referring to FIG. 2*c*, in a particular embodiment of the prize award structure, each prize card 16 includes prize indicia 18 thereon that indicates the prize award assigned to the respective card 16, wherein the prize indicia is covered by a removable covering 20, such as a pull-tab or a scratch-off coating (SOC) 22 (FIG. 2*b*).

In embodiment of the system 10 depicted in the figures, the game system 10 and package 12 are provided by a lottery game provider and the prize cards 16 are scratch-off lottery tickets 38 from the lottery game provider. In this case, the covering 20 can be a conventional scratch-off coating (SOC) 22 applied over the prize indicia 18, as with conventional scratch-off lottery tickets.

In a particular embodiment, the packages 12 may be offered for sale at a retail establishment that is authorized by a lottery agency to sell lottery products. The prize cards 16 may remain un-activated in the lottery system until the package 12 is sold at the point of sale (POS). Thus, the packs could be displayed and offered at a location in the retail establishment that is separate from the traditional lottery products. For example, the packages 12 need not be kept at the retail POS counter, which is advantageous for the retailer.

The lottery tickets 38 used for the game system 10 may be a subset of a larger production run of lottery tickets, wherein lottery tickets from the same run (and prize structure) are also available to the public outside of the game system 10, as is well-known in the industry. In an alternate embodiment, the lottery tickets 38 may be used exclusively for the game system 10 and have an overall prize structure across all of the game systems 10. For example, the lottery game provider may print a run of the lottery tickets 38 for packages of the game system 10 sold in a particular state or other region, wherein the collective lottery tickets 38 have a certain guaranteed prize structure distributed randomly between the all of the lottery tickets 38. In this embodiment, it may be that none, some, or all of the prize cards 16 (lottery tickets 38) in a particular package 12 have a monetary prize award assigned thereto.

In certain embodiments, it may be desired that each package 12 may have a minimum collective prize award value that is distributed randomly across at least certain prize cards 16 in the package 12. It may be desired to advertise this guaranteed prize award on the package 12. For example, it may be guaranteed that at least one prize card 16 in the first set of cards 14 is a $25 winner, and so forth. Alternatively, a consumer could purchase the package 12 for $35 and have a guaranteed minimum of $10 in prizes distributed by the prize cards 16.

In the embodiments wherein the prize cards 16 are lottery-tickets 38, such tickets may be treated by the lottery provider and sponsoring entity (e.g., a state lottery commission) as any other scratch-off lottery ticket sold in the region. For example, winning prize cards 16 may be redeemed by a player within the lottery system as would any other winning lottery ticket in the state or region.

Referring to FIGS. 1 and 3*a*-3*c*, the second set of cards 32 are configured as command cards 33, wherein each command card 33 includes written instructions to players as to how to gain or lose the prize cards 16. The package 12 contains a sufficient number of the prize cards 16 and the command cards 33 for play of a game wherein a plurality of the prize cards 16 are distributed to each of the players and a plurality of the prize cards 16 remain as common cards in a "pot."

Figure 3A:
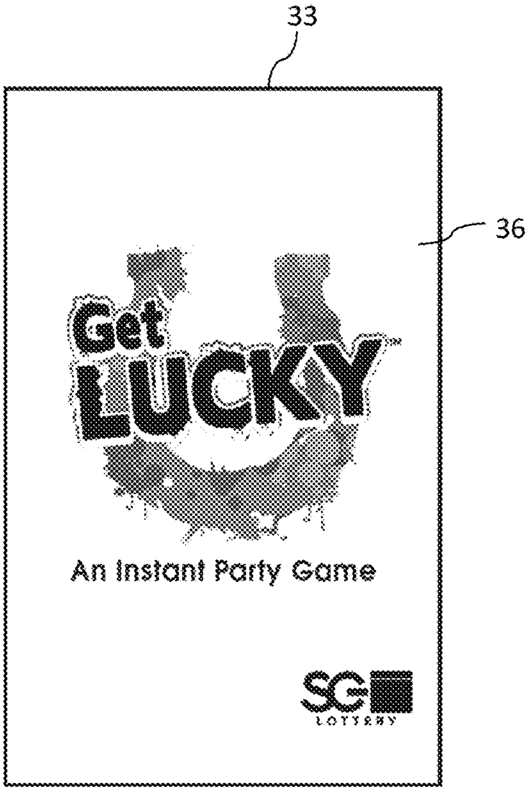
FIG. 3*a* is a back view of an embodiment of a command card.
Figure 3B:
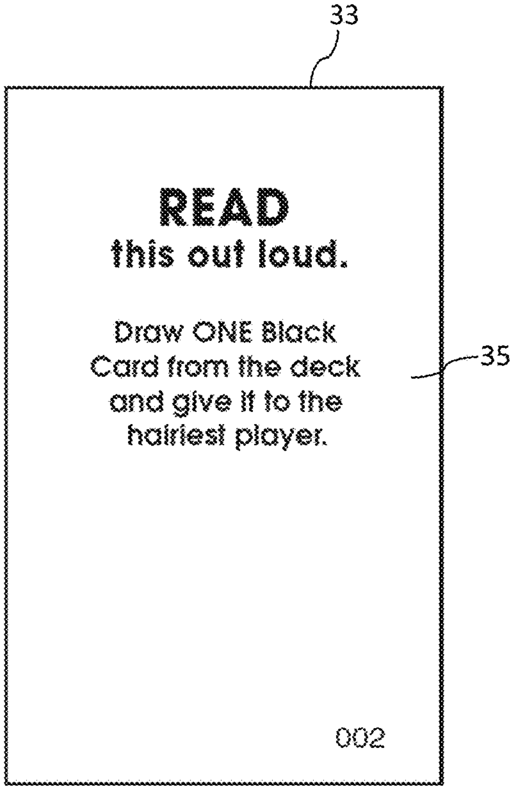
FIG. 3*b* is a front view of an embodiment of a command card with instructions for an act to be performed by the player (with an accompanying physical act)
Figure 3C:
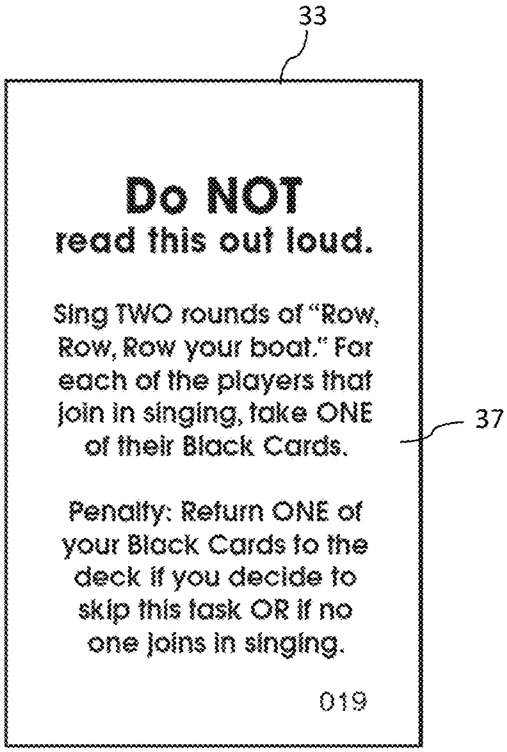
FIG. 3*c* is a front view of an embodiment of a command card with instructions for a verbal act to be performed by the player (with an accompanying physical act)

The instructions on the command card 33 may be presented in various ways. For example, in one embodiment, the instructions are printed instructions for verbal or non-verbal acts to be performed by the player. For example, referring to FIG. 3*b*, the instructions on the command card 33 require the player to read the card to the other players and perform a required act, which may be forfeiting one of their prize cards 16 to another player or the common pot of prize cards, or taking a prize card 16 from another player or the common pot of prize cards. Referring to FIG. 3*c*, other command cards 33 may instruct the player to not read the card to the other players, but to perform a specific act, wherein successful performance of the act results in the player taking a prize card 16 from another player or the common pot of prize cards and non-performance (or unsuccessful performance) of the act results in the player forfeiting one of their prize cards 16 to another player or to the common pot of prize cards.

In particular embodiments depicted in the figures, the prize cards 16 and the command cards 33 comprise visually distinguishing characteristics that enable the players to readily distinguish between and sort the prize 16 and command cards 33. For example, such characteristic may be a differentiating color on the back of the cards. The prize cards 16 may have a black background on the back 30 thereof and the command cards 33 may have a white background (or other differentiating colors or indicia) on the back 36 thereof, as depicted by the different backgrounds in FIGS. 2*a* and 3*a*.

Figure 4:
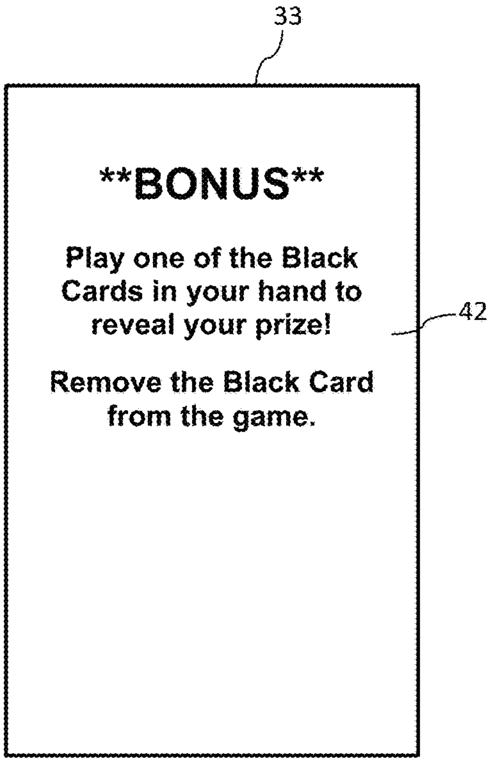
FIG. 4 is an embodiment of a bonus command card.

Referring to FIG. 4, in a particular embodiment, one or more of the command cards 33 may be a bonus card 42 that instructs the player to select and play one of their prize cards 16, wherein the played prize card 16 is removed from the game and retained by the player (i.e., the player cannot forfeit or lose the prize card 16). Another bonus card 42 may read, for example: "Read this out Loud. Each player scratch ONE of their Black Cards (only one). Next, pass the Black Card to the player on their right regardless of the outcome. This card is out of play."

Figure 5:
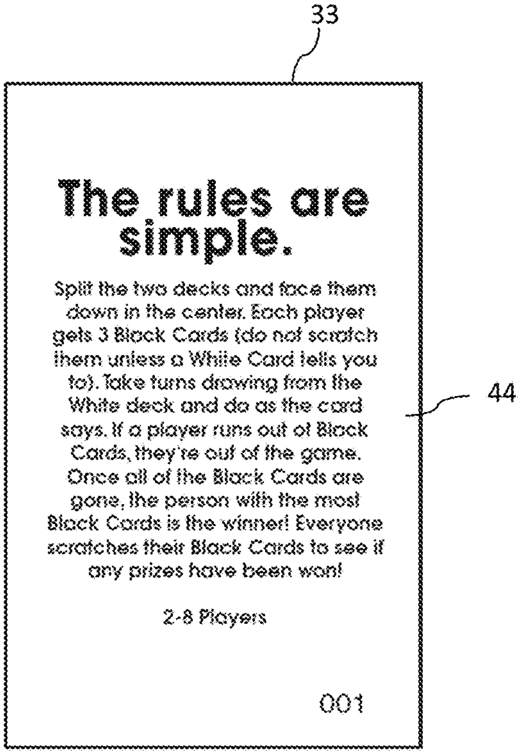
FIG. 5 is an embodiment of a game instruction card.

Referring to FIG. 5, one of the command cards 33 may be configured as a rule or instruction card 44 that instructs the players on how to play the game.

The command cards 33 may be the same for the plurality of packages 12 within a production run ("pulse") of the prize cards 16. For subsequent production runs, the command cards 33 may change in content and instructions, or could remain the same.

Referring again to FIG. 1, in certain embodiment, the card-based game system 10 may include one or more replacement sets 40 of the prize cards 16 that can be used for subsequent additional plays of the game system 10 without the need of an addition set of the command cards 33. In other words, the initial set of command cards 33 can be recycled with the replacement set(s) 40 of prize cards 16. The replacement set(s) 40 can be provided with the package 12 (as depicted by the replacement sets 40 within the package 12 in FIG. 1) or may be purchased separately from the package 12 (as depicted by the replacement sets 40 outside of the package 12 in FIG. 1).

Figure 6:
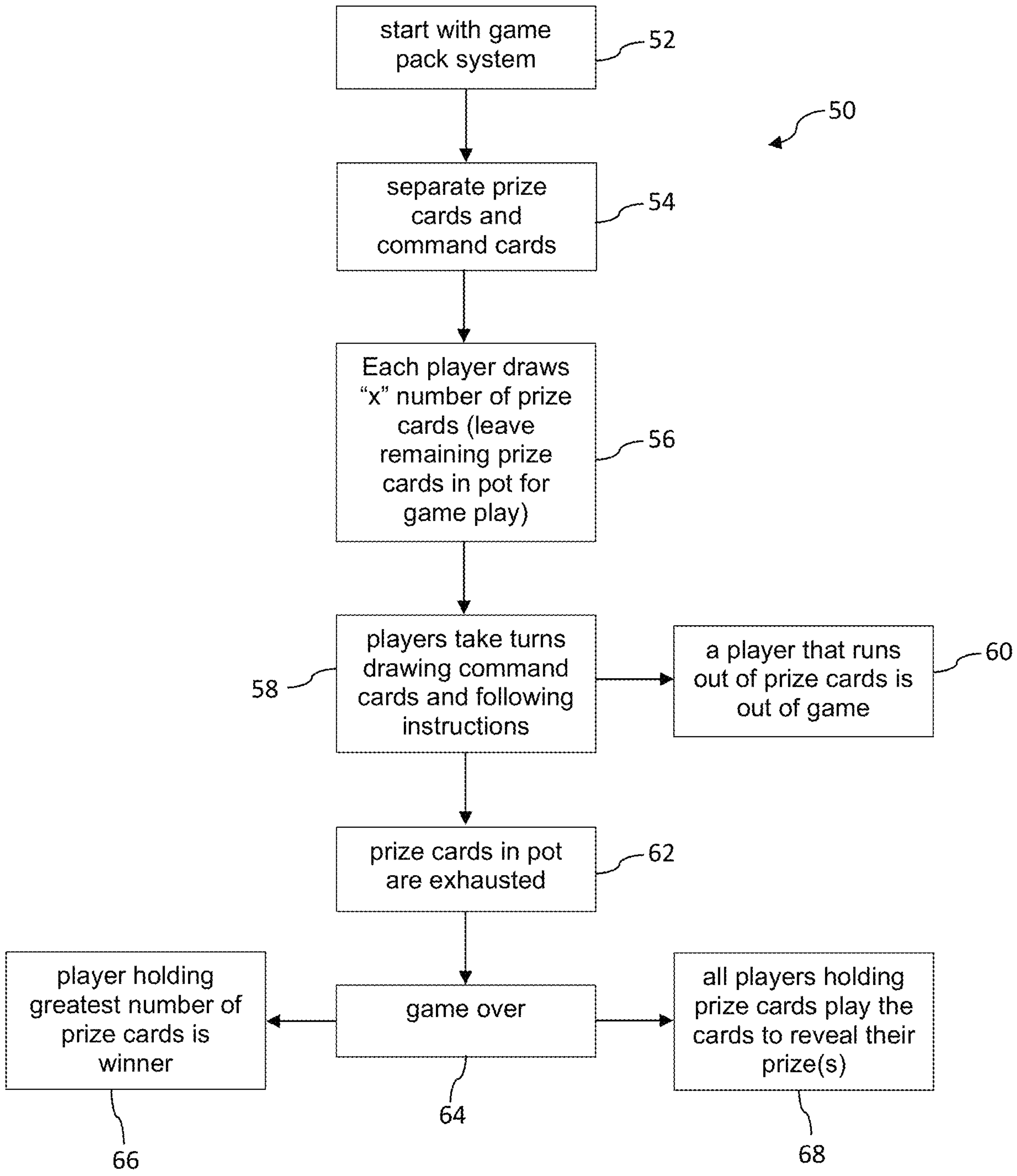
FIG. 6 is a flow chart of a method embodiment for playing the card-based game system in accordance with aspects of the present invention.

Referring to FIG. 6, the present invention also encompasses method embodiments 50 for conducting a card-based game with a plurality of players using the card-based game system 10 discussed above. For example, the method 50 may include starting the game at step 52, which includes acquiring the game package system 10.

At step 54, the package 12 is opened and the players separate the prize cards 16 from the command cards 33 (if not separated in the package 12).

At step 56, each player in the game is then provided with a defined number "x" of the prize cards 16, wherein the remaining prize cards 16 are designated as common prize cards in the game pot.

At step 58, the players take turns drawing one of the command cards 33 and performing verbal or non-verbal acts required by the command card 33, resulting in the player acquiring additional prize cards 16 or losing prize cards 16, as discussed above. Any player that loses all of the prize cards 16 in their hand is out of the game (step 60).

At step 62, the pot of common prize cards 16 has been exhausted and, thus, the game is terminated at step 64. At this time, the player holding a greatest number of the prize cards 16 is declared the winner in the game (step 66), which may or may not entail a prize.

At step 68, which may be any time after the game is terminated, the players "play" the prize cards 16 in their possession by removing the covering 20 from the prize indicia 18 to reveal the prize award assigned to the prize card 16 (which may a monetary award or zero value). As discussed above, the game system 10 may be provided by a lottery game provider, wherein the prize cards 16 are scratch-off lottery tickets 38 that are treated by the lottery game provider (and a sponsoring entity, such as a state or other governmental body) as any other scratch-off lottery ticket sold in the region. Thus, players can redeem winning prize cards 16 with the lottery provider as they would any other scratch-off lottery ticket.

The method may include using a replacement set of prize cards 40 to commence a subsequent game with the same set of command cards. The replacement set may be provided within the same package, or may be purchased separate from the package.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A card-based game system, comprising:

a package;

a first set of cards and a second set of cards contained in the package;

the first set of cards configured as prize cards having a potential prize associated therewith, each prize card comprising prize indicia indicating a prize award assigned to the prize card, the prize indicia covered by a removable covering;

the second set of cards configured as command cards, each command card comprising instructions to players to perform an act that results in a gain or loss of one or more of the prize cards;

the package containing a sufficient number of the prize cards and the command cards for play of a game wherein a plurality of the prize cards are distributed to each of a plurality of players and a plurality of the prize cards remain as common cards in the game; and wherein upon completion of the game, each of the players in possession of a prize card removes the covering to reveal the prize award assigned to the prize card.

2. The card-based game system as in claim 1, wherein the prize cards and the command cards comprise visually distinguishing characteristics.

3. The card-based game system as in claim 2, wherein the prize cards and the command cards comprise a differentiating color on a back surface thereof.

4. The card-based game system as in claim 1, wherein the package is provided by a lottery game provider, the prize cards comprising scratch-off lottery tickets, the covering comprising a scratch-off coating applied over the prize indicia.

5. The card-based game system as in claim 4, wherein the prize cards have a minimum collective prize award value that is advertised on the package.

6. The card-based game system as in claim 4, wherein winning ones of the scratch-off lottery tickets are redeemable via the lottery game provider.

7. The card-based game system as in claim 1, further comprising a replacement set of prize cards available without an associated set of command cards, wherein the replacement set of prize cards can be used with the first set of cards for play of a subsequent game.

8. The card-based game system as in claim 7, wherein the replacement set of prize cards is contained in the package.

9. The card-based game system as in claim 7, wherein the replacement set of prize cards is separate from the package.

10. The card-based game system as in claim 1, wherein the instructions on the command cards comprise printed instructions for verbal or non-verbal acts to be performed by the player.

11. The card-based game system as in claim 10, wherein the command cards comprise at least one bonus card that instructs the player to select and play one of their prize cards, wherein the played prize card is retained by the player.

12. A method for conducting a card-based game with a plurality of players using the card-based game system according to claim 1, the method comprising:

separating the prize cards and the command cards;

providing each player with a defined number of the prize cards and designating remaining prize cards as a pot of common prize cards;

the players taking turns drawing one of the command cards and performing verbal or non-verbal acts required by the command cards to acquire additional prize cards from the other players or from the pot of common prize cards, or to forfeit prize cards;

terminating play of the game when the pot of common prize cards has been exhausted, wherein the player holding a greatest number of the prize cards is declared a winner in the game.

13. The method according to claim 12, wherein the players forfeit prize cards to one or more other players or to the pot of common prize cards for not successfully performing the act required by their drawn command card.

14. The method according to claim 12, wherein upon termination of the game, the players remove the covering from over the prize indicia on their prize cards to reveal the prize award assigned to the prize card.

15. The method according to claim 14, wherein the package is provided by a lottery game provider, the prize cards comprising scratch-off lottery tickets, the covering comprising a scratch-off coating applied over the prize indicia, and wherein the players redeem the prize award assigned to the scratch-off lottery tickets via the lottery game provider.

16. The method according to claim 12, further comprising using a replacement set of prize cards to commence a subsequent game with the same second set of command cards.

17. The method according to claim 16, wherein the replacement set of prize cards is provided with the package.

18. The method according to claim 16, wherein the replacement set of prize cards is provided separate from the package.

* * * * *